No. 783,404. PATENTED FEB. 21, 1905.
C. LEWIN.
AUTOMATIC TAP.
APPLICATION FILED OCT. 17, 1904.
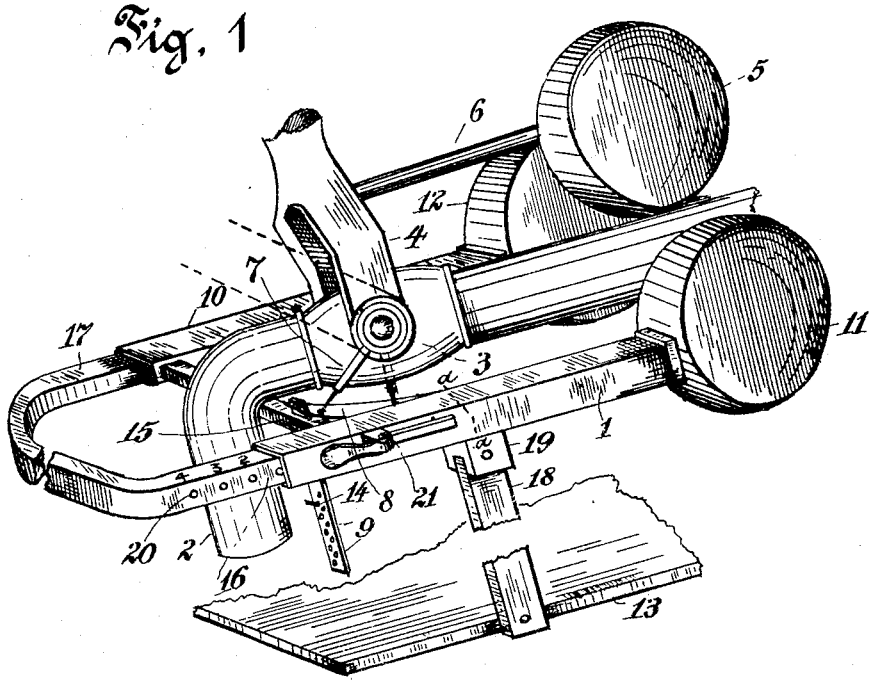
Fig. 1
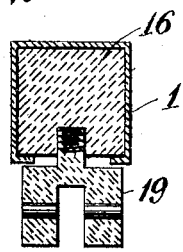
Fig. 2
Fig. 3.
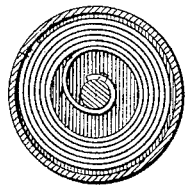
Fig. 4.
Witnesses
C. M. Billig.
A. R. Grandy
Carl Lewin
Inventor
by
Frank P. Medina
Attorney No. 783,404.

Patented February 21, 1905.

UNITED STATES PATENT OFFICE.

CARL LEWIN, OF SAN FRANCISCO, CALIFORNIA.

AUTOMATIC TAP.

SPECIFICATION forming part of Letters Patent No. 783,404, dated February 21, 1905.

Application filed October 17, 1904. Serial No. 228,773.

*To all whom it may concern:*

Be it known that I, CARL LEWIN. a subject of the Emperor of Germany, residing in the city and county of San Francisco, State of California, have invented certain new and useful Improvements in Automatic Taps, of which the following is a specification.

My invention relates to taps which automatically serve a measured quantity of liquid. The object of my improvement is to provide means of readily adapting taps to the automatic service of liquids of various specific gravities and to provide new and improved means of measuring the same. I attain these objects by means illustrated in the accompanying drawings, in which—

Figure 1 is a perspective view of an automatic tap embodying my improvements; Fig. 2, a vertical section of part thereof along the line *a a*, Fig. 1; Fig. 3, a top view of the arm 1, Fig. 1.

Similar numerals refer to similar parts throughout the several views.

The faucet 2 is opened and closed by the valve 3. The said valve is operated by the lever 4, said lever being operated to close said valve by the spring 5, and connecting-rod 6. The valve 3 carries a latch 7, which is releasably caught by spring 8 when said lever is in position holding said valve open. Spring 8 is attached at one end to the frame of the faucet and to a dependent scale 9 at its other end. The arms 1 10 are supported by coiled springs 11 12 at one end and carry a platform or equivalent device 13 by connections with arms 1 10 for holding the vessel receiving the liquid. A peg 14 in dependent scale 9 catches bar 15 when said bar descends far enough, said descent being caused by the weight of liquid in the receiving vessel on platform 13. The scale is thereby depressed, bringing spring 8 with it and releasing latch 7, whereby valve is automatically closed by spring 5 through connection 6 with lever 4.

Thus far my invention resembles automatic tap described and claimed in my application of July 5, 1904, Serial No. 215,429, and is herein described and illustrated to make clear the nature of my improvements.

These improvements consist of means of varying the distance between the load on the arms 1 and 10 from the supporting-spring 11 12 and in the combinations of said means with other details of my apparatus.

The arms 1 10 consist of two parts, a longitudinally-fixed member and a longitudinally-movable member 16 17 slidable therein. The platform aforesaid is attached to said movable member by connections 18 19. Said movable member is provided with a series of holes 20, into which a pin on the spring-key 21 is insertible through an aperture in said fixed member. The series aforesaid forms a scale and is numbered from right to left.

The springs 11 12 are adjusted so that a quantity of liquid poured into the vessel on platform 13, corresponding to the numbers on scale aforesaid, shall by its weight depress the arms 1 10 just far enough to release the latch 7 by engagement of bar 15 with peg 14.

The scale aforesaid is measured off in measures of capacity, as pints, quarts, or gallons. It is obvious that the nearer the point of support of the parts 18 19 to the sustaining-springs aforesaid the more liquid of a given specific gravity must flow into the said vessel before the moving parts will be sufficiently depressed to release the cut-off mechanism. Conversely the farther from said springs the point of attachment of said platform may be the less the weight of liquid required to operate said cut-off mechanism.

Attention is now directed to dependent rod 9. It is also provided with a series of holes, in which a peg 14 is insertible. This series forms a scale corresponding to the specific gravity of various liquids. If the tap is to be used for a heavy liquid, the peg is inserted in a hole near the bottom of said rod, since a pint of heavy liquid would depress the arms farther than a pint of light liquid would depress them. If the tap is to be used for liquid of less specific gravity, the peg 14 is moved to a higher position in said scale, since a pint of the lighter liquid would not depress the mechanism so far. The scale on dependent rod aforesaid may be marked for beer, wine, oils, or other liquids according to their specific gravity and to which one of them the tap is to be used for drawing. Thus by fixing the position of peg 14 the tap may be adapted to automatically cut-off the flow of any liquid measured in pints or other measures of capacity by scale 20 aforesaid.

In practice the peg 14 is set for some particular liquid—say beer. The arms 16 17 are adjusted until the desired quantity in measures of capacity is indicated. Thereupon the tap is turned on and the releasing mechanism is set in operation when the indicated quantity is drawn. If the same tap is wanted for drawing some other liquid—say olive oil—the peg 14 is set for the said liquid once for all, and the tap will cut off at the indicated measures.

It is to be noted that the product of the weight of the liquid into the distance from the supporting-springs is constant for the same liquid or for liquids of equal specific gravity. Therefore the arms 16 17 will be depressed through equal distances for liquids of equal specific gravity, and the peg 14 may be adjusted for each liquid.

Having described my invention, what I claim as new, and desire to secure by Letters Patent of the United States, is—

In an automatic tap of the class described, the combination of spring-supported arms carrying the weight of liquid and having means of varying the distance of the point of attachment of said weight from said supporting-springs, with a means of adjusting the operation of said tap for liquids of various specific gravities, consisting of the dependent rod 9 with its peg 14, substantially as hereinbefore described.

In testimony whereof I have hereunto set my hand in the presence of two witnesses.

CARL LEWIN.

Witnesses:
 C. M. BILLIG,
 MARTIN ARONSOHN.